Jan. 5, 1971 S. ALBARDA 3,552,861
DEVICE FOR DETERMINING THE DISPLACEMENT OF A COMPONENT
OF A MACHINE TOOL WITH THE AID OF A GRATING
MECHANICALLY CONNECTED TO THE COMPONENT
Filed Oct. 3, 1967 2 Sheets-Sheet 1

INVENTOR.
SCATO ALBARDA

BY

AGENT 3,552,861
DEVICE FOR DETERMINING THE DISPLACEMENT OF A COMPONENT OF A MACHINE TOOL WITH THE AID OF A GRATING MECHANICALLY CONNECTED TO THE COMPONENT
Scato Albarda, Emmasingel, Netherlands, assignor, by mesne assignments, to U.S. Philips Corporation, New York, N.Y., a corporation of Delaware
Filed Oct. 3, 1967, Ser. No. 672,596
Claims priority, application Netherlands, Oct. 6, 1966, 6614064
Int. Cl. G01b *11/04;* G02b *5/12*
U.S. Cl. 356—169                              4 Claims

ABSTRACT OF THE DISCLOSURE

A device for determining the linear displacement of a machine tool on which a first grating is placed. A scanning image formed by projecting the image of an additional fixed gating onto a rotating polyhedron reflector is bifurcated by an image inverting mirror. The scanning image and spatially separated inverted scanning image are projected onto different portions of the first grating.

Figure 1:
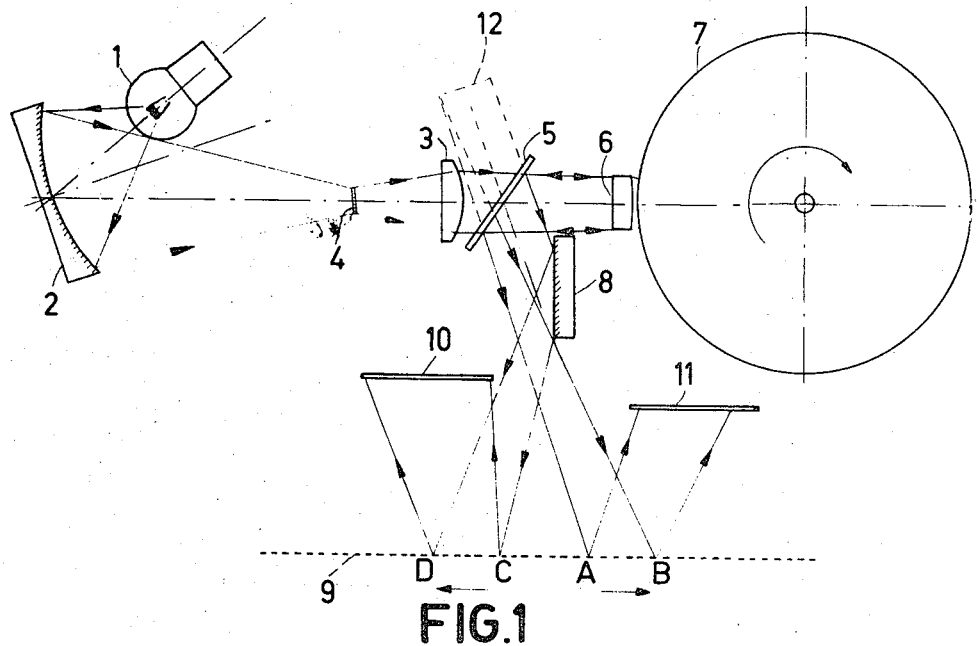

This invention relates to a device for determining the displacement of a component of a machine tool with the aid of a grating mechanically connected to the component, which grating is situated in the light path between a source of light and a photosensitive element which converts the incident light into an electric signal, and in which in addition to the grating a rotating, light-reflective regular polyhedron is incorporated in the light path.

Such a device is known. It is the subject of U.S. Pat. No. 3,371,215 issued to applicant herein. In the known device the greater part of the beam of light emerging from the light source is led through one part of the grating to the rotating polyhedron, reflected by a facet of the polyhedron to another part of the grating and subsequently led to a first photosensitive element. A small part of the beam of light emerging from the light source is intercepted and follows a different path: after bifurcation it impinges upon the rotating polyhedron, is reflected and falls on a second photosensitive element. The bifurcated part thus does not enter into interaction with the grating.

The displacement of the grating and hence that of the component of the machine tool can be derived from the phase difference of the electric signals (measured signal and reference signal) provided by the two photosensitive elements.

The place of reflection of the main beam and the bifurcated beam on the polyhedron may be chosen. The reflection may either take place on various facets or on one and the same facet of the polyhedron. In the latter case the places of reflection have an appropriate axial distance.

In both cases drawbacks are found to occur which relate to the deviations of the applied polyhedron from the ideal polyhedron. Said deviations comprise the eccentricity and the index errors of the relevant mirror polyhedron. An index error is to be understood to mean any deviation from the angle which must be enclosed by two successive facets. Said ideal angle is equal to $2\pi/n$ radials, if $n$ is the number of facets. The deviations cause a phase oscillation of the electric signals (measured signal and reference signal) relative to each other. In fact, when rotating the polyhedron the striking of successive facets of the polyhedron by the beam of light will not take place at regularly successive instants due to the said deviations.

It is true that in case the beams strike the same facet, the eccentricity has no influence on the phase difference between the two signals. However, another deviation of the polyhedron does manifest itself, namely an index error variable with the height of the polyhedron. The result is again a phase oscillation of the measured signal relative to the reference signal.

An object of the invention is to obviate the drawbacks of the known device. To that end it is characterized in that a fixed grating is placed in the light path between the source of light and the polyhedron and that a system bifurcating the beam of light is incorporated between the polyhedron and the grating which is mechanically connected to the component of the machine tool in such manner that two spatially separated, relatively reversed images of the fixed grating are formed on the movable grating.

Figure 2:
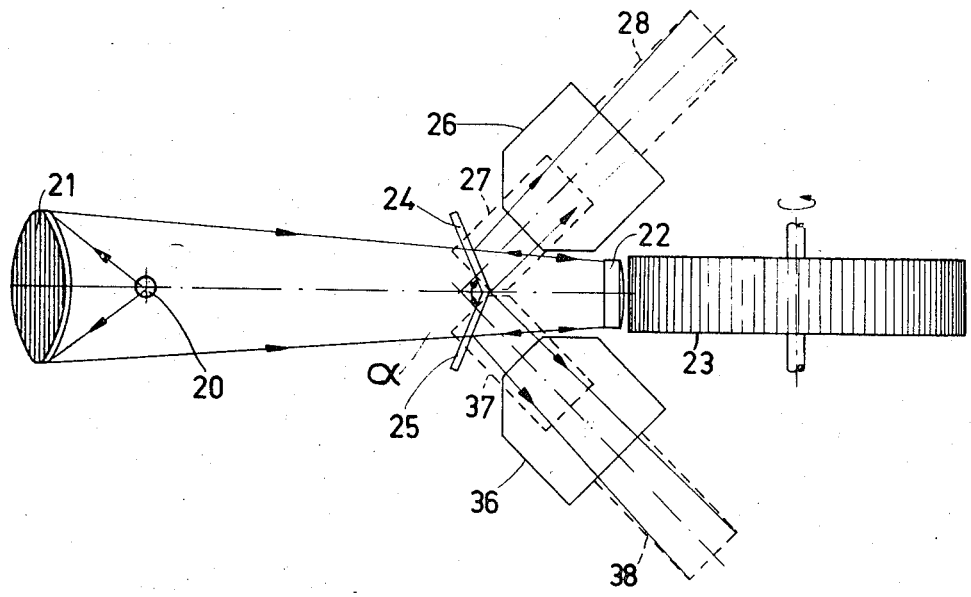
Figure 3:
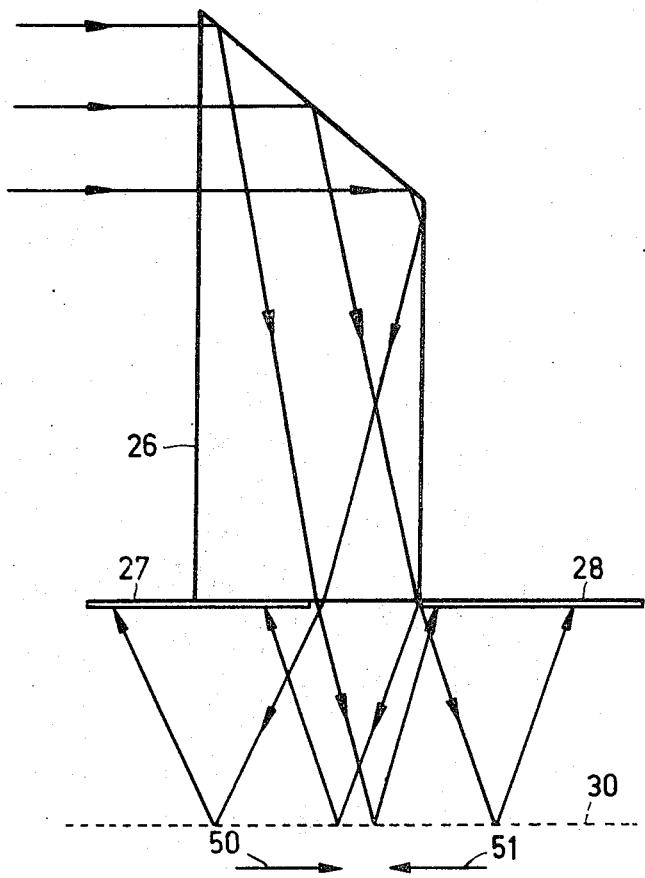
Figure 4:
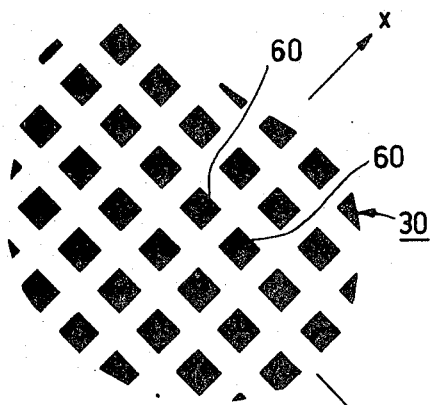

In order that the invention may be readily carried into effect it will now be described in detail, by way of example, with reference to the accompanying diagrammatic drawings, in which FIG. 1 shows a first embodiment of a device according to the invention, FIG. 2 shows a second embodiment and FIGS. 3 and 4 show components of FIG. 2.

In the device shown in FIG. 1, the lamp 1 throws light upon the fixed grating 4 through the condenser mirror 2. Said grating consists, for example, of a glass plate having vapour-deposited pattern of alternately transparent and opaque parallel lines of a defined width. Through the lens 3, the semipermeable mirror 5 and the lens 6 the beam of light is reflected on one facet of the mirror polyhedron 7 situated immediately behind the lens 6. The reflected beam of light is in turn partly reflected by the semipermeable mirror 5 (by 12 is indicated the virtual position of the lens 6) and impinges on the reflective grating 9. The grating 9, just like the grating 4, consists of alternately reflective and black parallel lines of defined widths.

In the light path between the mirror 5 and the grating 9 a mirror 8 is provided which throws half the beam of light symmertically to the left. As is clearly shown in the figure, the image CD on the grating 9 will move to the left and the image AB on the grating 9 to the right when the polyhedron 7 is rotated in the direction indicated by the arrow. The speed of movement $V_0$ to the left is of course equal to that to the right. Said speed $V_0$ is: $N\,n\,\text{ms}/1000$ m./min. If $N$ is the number of revolutions of the polyhedron per min., $n$=the number of facets of the polyhedron, $m$=the number of grating pitches per image shaft and $s$=the pitch of the grating 9 in mm. An image shaft is to be understood to mean the distance between two images of one object, i.e. one grating line, through two adjoining facets.

It stands to reason that the pitch of the grating 4 and the geometry of the lenses 3 and 6 are chosen to be such that the pitch of the projected grating is equal to the pitch of the grating 9.

When the grating 9 is stationary, the photo-electric cells 10 and 11 each produce a signal of the same frequency $f_0$, for which $f_0 = V_0/s$ applies. Said signals are free from the errors of the known device since the images received by the photo-electric cells 10 and 11 originate from the same place of a facet of the polyhedron 7. Errors in the polyhedron 7 therefore result in frequency variations of the signals produced by the photo-electric cells 10 and 11, but not in phase oscillations of said signals relative to each other.

When the grating is displaced relative to the photoelectric cells the speed of movement of the image of the grating 4 on the grating 9 becomes $V_0 - V$ and $V_0 + V$, respectively. (V=speed at which the grating is displayed.) The frequency of the signals produced by the photoelectric cells 10 and 11 then is: $f_1 = f_0 + \Delta f$ and $f_2 = f_0 - \Delta f$, $\Delta f$ being $V/s$.

The device according to the invention has therefore the additional advantage that the amplifiers connected to the photo-electric cells 10 and 11 may be equal: the central frequency of said amplifiers is $f_0$ and the bandwidth is $\Delta f$.

In one embodiment we had N=375; $n$=240; $m$=5; $s$=0.64 mm., so that $V_0$=288 m./min.

In the device shown in FIG. 2 the lamp 20 throws a beam of light on the mirror polyhedron 23 through the transmitting grating lens 21, the semipermeable mirror 24, 25 and the lens 22. The transmitting grating lens 21 is a combination of a lens with a vapour-deposited reflective grating. The beam of light reflected on one facet of the mirror polyhedron 23 is in turn partly reflected on the semipermeable mirror 24, 25, which consists of two parts enclosing an obtuse angle. The plane of intersection of the parts 24 and 25 of the mirror divides the beam in approximately two equal halves which are symmetrical relative to the axis of the lens 22.

One half of the beam reflected by the mirror 24, 25 impinges on the prism 26 which performs the same function as the mirror 8 in the device shown in FIG. 1. Via the prism 26, in a manner analogous to that in the device shown in FIG. 1, the divided beam impinges partly on the photo-electric cell 27 (comparable with the photo-electric cell 10 of FIG. 1) through the grating 30, and partly on the photo-electric cell 28 (comparable with the photo-electric cell 11 of FIG. 1). FIG. 3 shows a few rays of light and the arrows 50 and 51 indicate the direction of the images to be supplied to the photo-electric cells 27 and 28.

The other half of the beam reflected by the mirror 24, 25 impinges on the prism 36 and subsequently through the grating 30 on the photo-electric cells 37 and 38. The grating 30 is a so-called point grating.

If $\alpha$ is given a suitable value, namely $\alpha$=135°, then the divided beams reflected by the mirror 24, 25 are perpendicular to each other and the point grating 30 has the shape as is shown in FIG. 4. The square blocks 60 do not reflect the light, the areas situated in between do.

With the aid of the device shown in FIG. 2 mutually perpendicular displacements can be measured.

It is often desirable to use coded measuring systems. The gratings must then be "marked," namely fixed and movable grating in an equal manner. This is done by building them up of groups of an equal number of parallel lines situated at a mutually equal distance $s$, the groups having a mutual distance of a whole number of times $s$.

The electric signals applied to the photo-electric cells are now modulated in amplitude. The modulation frequency is equal to $\frac{1}{10}f_0$, since the group pitch is chosen to be equal to 10$s$.

With the aid of additional amplifiers which are connected to the photo-electric cells and are tuned to a frequency equal to $\frac{1}{10}f_0$, it is now possible to determine the phase differences between the signals of a frequency corresponding to a period $d$=10$s$.

In one embodiment of a coded system we had: N=375; $n$=240; $m$=10; $s$=0.4 mm.; the distance $d$ of the groups consisting of 7 lines: $d$=3; $s$=1.2 mm.; $V_0$=360 m./min.

What is claimed is:

1. A device for determining the displacement of a component of a machine tool, comprising a first grating mechanically connected to the component, a second stationary grating, a rotatable mirrored polyhedron, means for projecting an image of the second grating on to the mirrored faces of the polyhedron, whereby scanning motion is imparted to the image, optical means for directing the scanning image from the polyhedron toward a first portion of the first grating, and inverting means intermediate the directing means and the first grating for reversing a portion of the scanning image and for directing the reversed image toward a second portion of the first grating spatially removed from the first portion of the first grating, whereby two spatially separated and relatively reversed scanning images of the second stationary grating are projected on the first grating attached to the component of the machine tool.

2. A device as claimed in claim 1, wherein the inverting means comprises a reflective surface transverse to the first grating.

3. A device as claimed in claim 1, wherein the optical means comprises a semipermeable mirror.

4. A device as claimed in claim 1, wherein the first grating is a point grating, wherein the semipermeable mirror comprises two semipermeable planar mirrored elements joined at an angle of 135° in the beam of the projected image of the second grating intermediate the second grating and the polyhedron, whereby the scanning image of the second grating reflected from the polyhedron is divided into two orthogonal scanning image beams, wherein said optical means comprises a first internal reflecting face of a separate prism placed in the path of each of the orthogonal scanning image beams and oriented to reflect each orthogonal scanning image beam on to a separate first part of the point grating, and wherein the inverting means comprises a second internal reflecting face of each of the separate prisms and oriented to reverse and reflect part of the image beams reflected from each first internal prism face on to a separate second part of the point grating.

References Cited

UNITED STATES PATENTS 3,175,093  3/1965  Lang _____ 250—237

RONALD L. WIBERT, Primary Examiner

P. K. GODWIN, Assistant Examiner

U.S. Cl. X.R.

250—237; 350—99, 162, 285, 289; 356—172